United States Patent
Miyazawa et al.

(10) Patent No.: US 9,507,507 B2
(45) Date of Patent: Nov. 29, 2016

(54) INFORMATION PROCESSING APPARATUS, INFORMATION PROCESSING METHOD AND PROGRAM

(75) Inventors: Yusuke Miyazawa, Tokyo (JP); Fuminori Homma, Tokyo (JP); Tatsushi Nashida, Kanagawa (JP); Kouichi Matsuda, Tokyo (JP)

(73) Assignee: Sony Corporation, Tokyo (JP)

( * ) Notice: Subject to any disclaimer, the term of this patent is extended or adjusted under 35 U.S.C. 154(b) by 584 days.

(21) Appl. No.: 12/604,894

(22) Filed: Oct. 23, 2009

(65) Prior Publication Data

US 2010/0110031 A1 May 6, 2010

(30) Foreign Application Priority Data

Oct. 30, 2008 (JP) ................ P2008-280021

(51) Int. Cl.
*G06F 3/041* (2006.01)
*G06F 3/0488* (2013.01)

(52) U.S. Cl.
CPC ......... *G06F 3/0488* (2013.01); *G06F 3/04883* (2013.01); *G06F 2203/04808* (2013.01)

(58) Field of Classification Search
CPC ..................................... G06F 3/041
See application file for complete search history.

(56) References Cited

U.S. PATENT DOCUMENTS

| | | | |
|---|---|---|---|
| 5,451,724 A * | 9/1995 | Nakazawa et al. | 178/18.05 |
| 2002/0167699 A1 | 11/2002 | Verplaetse et al. | |
| 2003/0025678 A1 * | 2/2003 | Lee | G06F 3/0488 345/173 |
| 2004/0169674 A1 | 9/2004 | Linjama | |
| 2006/0026521 A1 * | 2/2006 | Hotelling | G06F 3/0418 715/702 |
| 2006/0071913 A1 * | 4/2006 | Wang et al. | 345/173 |
| 2006/0097991 A1 * | 5/2006 | Hotelling et al. | 345/173 |
| 2006/0197753 A1 | 9/2006 | Hotelling | |
| 2007/0257881 A1 | 11/2007 | Nurmela et al. | |
| 2008/0260176 A1 | 10/2008 | Hollemans et al. | |
| 2009/0153289 A1 * | 6/2009 | Hope et al. | 340/5.1 |
| 2009/0239587 A1 | 9/2009 | Negron et al. | |

FOREIGN PATENT DOCUMENTS

| | | |
|---|---|---|
| EP | 1 158 785 A2 | 11/2001 |
| EP | 2 131 263 A1 | 12/2009 |

(Continued)

OTHER PUBLICATIONS

Search Report in European Application No. EP 09 25 2505 (Mar. 25, 2010).

*Primary Examiner* — Nicholas Lee
(74) *Attorney, Agent, or Firm* — Paratus Law Group, PLLC

(57) ABSTRACT

An information processing apparatus has: a touch operating unit touch-operating by at least operators; a detecting unit for detecting a touch state of each of the operators in touch with the touch operating unit; a coordinate system determining unit for determining a coordinate system of the touch operating unit in accordance with an operating direction of the operators detected by the detecting unit; a relative position calculating unit for calculating a relative position of each of the two or more operators from a touch position of the operators detected by the detecting unit and the coordinate system of the touch operating unit determined by the coordinate system determining unit; and a command issuing unit for issuing a predetermined operation command based on the touch state of each of the operators detected by the detecting unit at the relative position of the operators calculated by the relative position calculating unit.

17 Claims, 16 Drawing Sheets

(56) References Cited

FOREIGN PATENT DOCUMENTS

| JP | 2005-339420 | 12/2005 |
|---|---|---|
| JP | 2007-257526 | 10/2007 |
| JP | 2008-537615 | 9/2008 |
| WO | WO 02/088853 A1 | 11/2002 |
| WO | WO 2005/099301 A1 | 10/2005 |

* cited by examiner

FIG.1
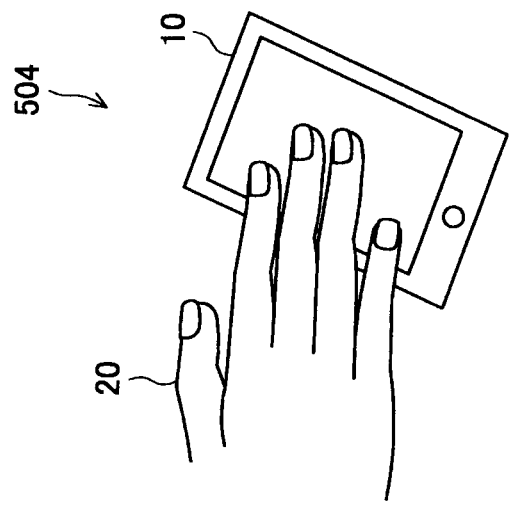
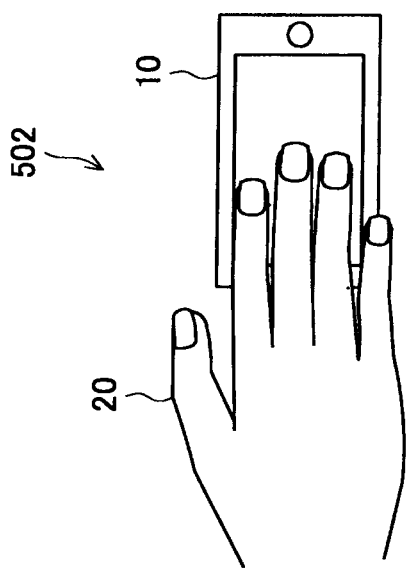

FIG.9

| T[msec] | INDEX FINGER | MIDDLE FINGER |
|---|---|---|
| Past | × | × |
| | × | × |
| | × | × |
| | × | × |
| START 1 | ○ | × |
| | ○ | × |
| | ○ | × |
| | ○ | ○ |
| | ○ | ○ |
| | ○ | ○ |
| START 2 | ○ | × |
| | ○ | × |
| Now | ○ | × |

○: IN TOUCH   ×: OUT OF TOUCH

410

- THE TIME WHEN FIRST FINGER HAS COME INTO TOUCH
- GIVEN TIME PERIOD OR MORE, AND
- THE TIME WHEN SECOND FINGER HAS COME INTO TOUCH
- GIVE TIME PERIOD OR LESS, THEN, "STEP FORWARD"
- THE TIME WHEN SECOND FINGER HAS COME OUT OF TOUCH

| T[msec] | INDEX FINGER | MIDDLE FINGER |
|---|---|---|
| Past | × | × |
| | × | × |
| | × | × |
| | × | × |
| START 1 | ○ | × |
| | ○ | × |
| | ○ | × |
| | ○ | ○ |
| | ○ | ○ |
| START 2 | ○ | ○ |
| | ○ | ○ |
| Now | ○ | ○ |

○: IN TOUCH   ×: OUT OF TOUCH

412

- THE TIME WHEN FIRST FINGER HAS COME INTO TOUCH
- GIVEN TIME PERIOD OR MORE, AND
- THE TIME WHEN SECOND FINGER HAS COME INTO TOUCH
- GIVEN TIME PERIOD OR MORE, THEN, "FAST-FORWARD" WHILE THE FINGER IS IN TOUCH

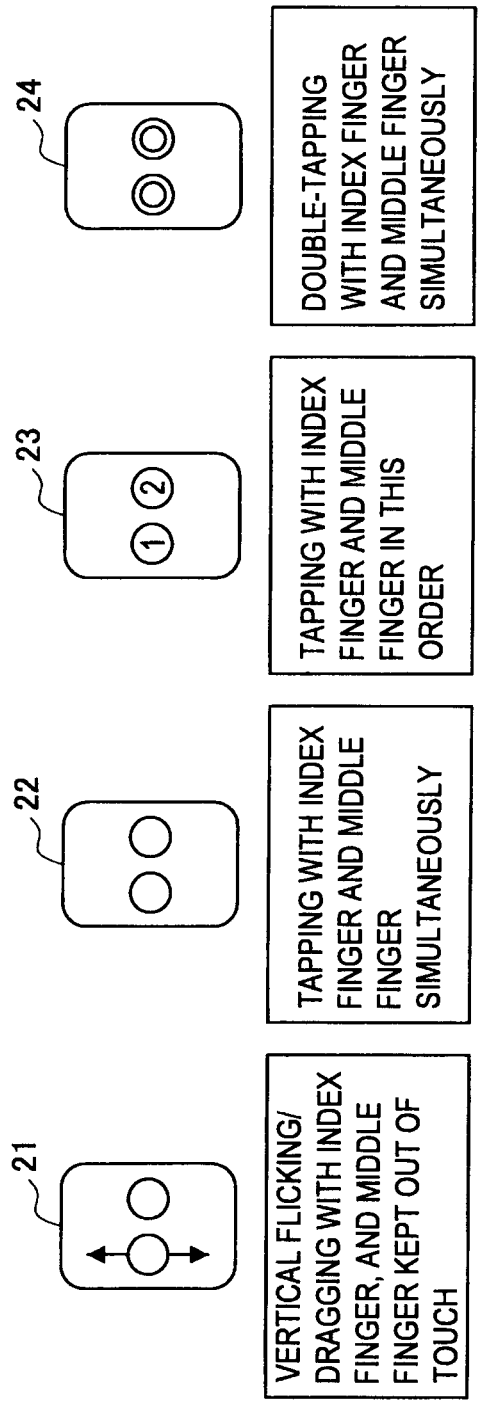

FIG.11
■TWO-FINGER OPERATION: INCLUDING FLICKING/ DRAGGING
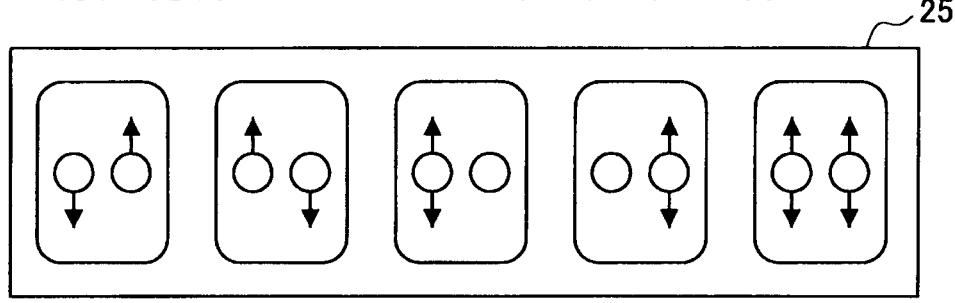
■TWO-FINGER OPERATION: INCLUDING TAPPING ONLY
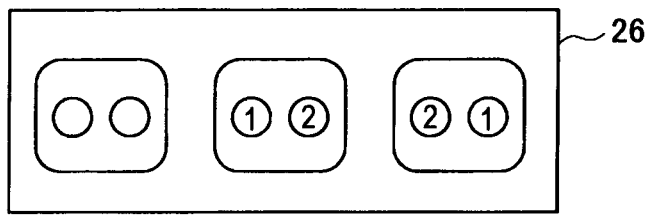
■ONE-FINGER OPERATION: TAPPING AND FLICKING/ DRAGGING
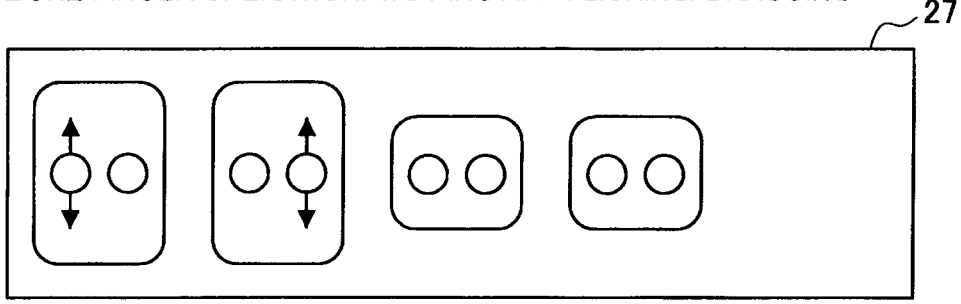

FIG.12
■ OPERATION WITH TWO OUT OF THREE FINGERS: INCLUDING FLICKING/ DRAGGING
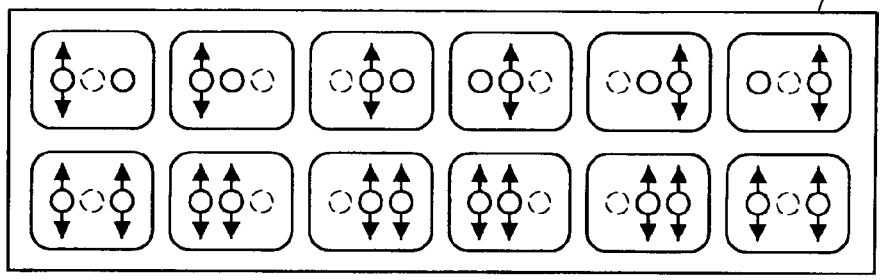
■ OPERATION WITH TWO OUT OF THREE FINGERS: TAPPING
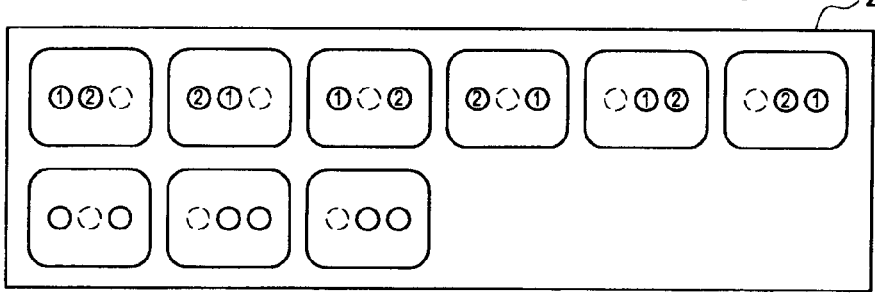
■ OPERATION WITH ONE OUT OF THREE FINGERS: DRAGGING AND TAPPING
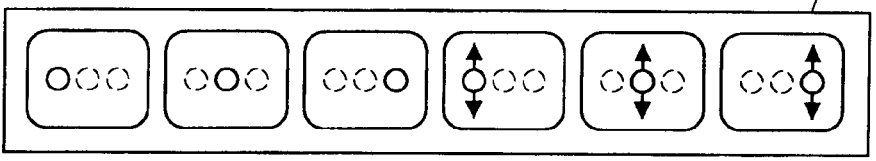
■ OPERATION WITH THREE FINGERS: INCLUDING FLICKING/ DRAGGING
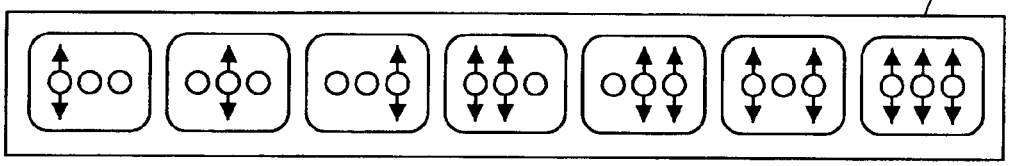
■ OPERATION WITH THREE FINGERS: TAPPING ONLY
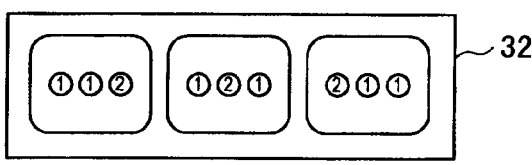
■ OPERATION WITH THREE FINGERS: TAPPING ONLY
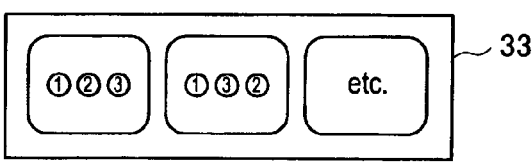

FIG.13
• MODE SWITCHING
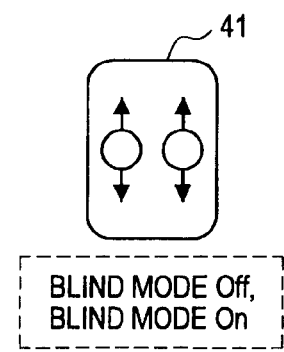
BLIND MODE Off,
BLIND MODE On
• PLAY/ STOP
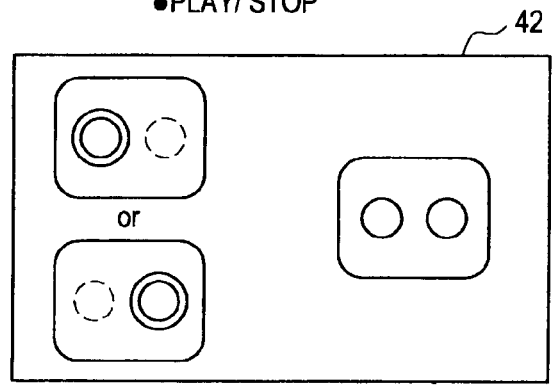
• FAST-FORWARD/
STEP FORWARD
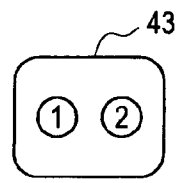
• REWIND/ STEP
BACKWARD
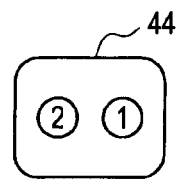
CONTINUE PRESSING FOR
FAST-FORWARD AND TAP
FOR STEP FORWARD
• VOLUME
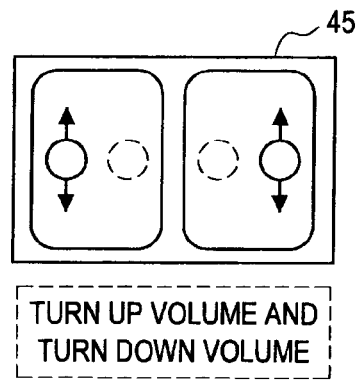
TURN UP VOLUME AND
TURN DOWN VOLUME

FIG.14
•MODE SWITCHING
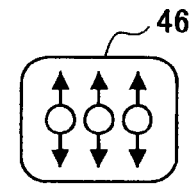
46
BLIND MODE Off,
BLIND MODE On
•PLAY/ STOP
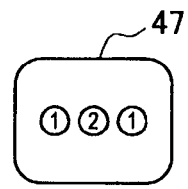
47
•FAST-FORWARD/
STEP FORWARD
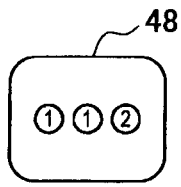
48
CONTINUE PRESSING FOR
FAST-FORWARD AND TAP
FOR STEP FORWARD
•REWIND/
STEP BACKWARD
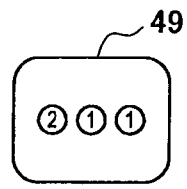
49
•VOLUME
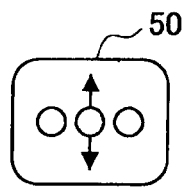
50
TURN UP VOLUME AND
TURN DOWN VOLUME FIG.16
TWO-FINGER OPERATION
●CHANGE SELECTION TARGET   ●TO HIGHER LAYER   ●TO LOWER LAYER
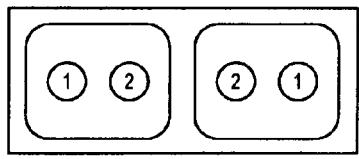 ~52   ~53  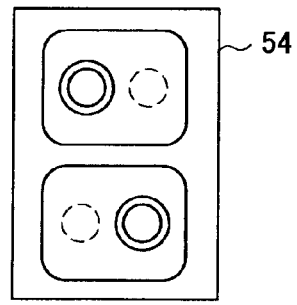 ~54
CONTINUE PRESSING FOR STEP FORWARD AND TAP FOR NEXT INDEX
THREE-FINGER OPERATION
●CHANGE SELECTION TARGET   ●TO HIGHER LAYER   ●TO LOWER LAYER
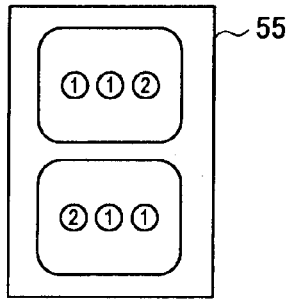 ~55   ~56   ~57
CONTINUE PRESSING FOR STEP FORWARD AND TAP FOR NEXT INDEX

INFORMATION PROCESSING APPARATUS, INFORMATION PROCESSING METHOD AND PROGRAM

BACKGROUND OF THE INVENTION

1. Field of the Invention

The present invention relates to an information processing apparatus, an information processing method and a program, and particularly to an information processing apparatus, an information processing method and a program capable of performing any operations with use of a touch screen.

2. Description of the Related Art

One of display devices is a touch screen (touch panel) provided with an electric capacitance type touch sensor or a resistance film type touch sensor at the surface of a display unit of a liquid crystal display or the like. With this touch screen, inputting to the information processing apparatus is made by touching the screen of the display unit, which can facilitate user's handling of the information processing apparatus.

In inputting with use of the touch screen, there is disclosed a technique of improving user's usability (see Japanese Patent Application Laid-Open No. 2005-339420, for example). According to Japanese Patent Application Laid-Open No. 2005-339420, it has become possible to receive input of line drawings by the touch screen, display a menu screen image and switch screen images in accordance with the gesture by a finger detected by the touch screen.

SUMMARY OF THE INVENTION

However, there is an issue that a user has to visually recognize the display and check the display screen in performing a desired operation. For example, when the user performs any operation with use of the touch screen in the bag or pocket, he needs to take out the device of the bag or pocket to visually recognize the display. Further, in order to operate the device with determined gesture, he needs to hold the device in a fixed orientation.

Then, the present invention has been made in view of the foregoing issues, and it is desirable to provide a novel and improved information processing apparatus, information processing method and program capable of performing a desired operation with use of a touch screen panel without visually recognizing the display.

According to an embodiment of the present invention, there is provided an information processing apparatus including a touch operating unit touch-operating by operators, a detecting unit for detecting a touch state of each of the operators in touch with the touch operating unit, a coordinate system determining unit for determining a coordinate system of the touch operating unit in accordance with an operating direction of the operators detected by the detecting unit, a relative position calculating unit for calculating a relative position of each of the two of more operators from a touch position of the two or more operators detected by the detecting unit by an additional touch operation by the two or more operators and the coordinate system of the touch operating unit determined by the coordinate system determining unit, and a command issuing unit for issuing a predetermined operation command based on the touch state of each of the two or more operators detected by the detecting unit at the relative position of the two or more operators calculated by the relative position calculating unit.

According to this structure, the operating state of each of the operators in touch with the touch operating unit is detected to determine the coordinate system of the touch operating unit in accordance with the operating direction of the operator. Then, the touch positions of two or more operators detected by the detecting unit by additional touch operations by the two or more operators and the determined coordinate system are used to calculate relative positions of the two or more operators. And the touch states of the two or more operators at the relative positions are used as a basis so as to issue a predetermined operation command.

Accordingly, regardless of how the housing of the information processing apparatus is oriented, the operating directions of the operators are judged so that the user can perform desired operations without paying attention to the orientation of the housing. Hence, the user can perform desired operations with the touch screen panel without visually recognizing the housing or display of the information processing apparatus. For example, when the information processing apparatus is placed in the bag or pocket, the user can perform desired operations without taking it out of the pocket or bag.

The coordinate system determining unit may determine the coordinate system of the touch operating unit on a condition where a y axis is a direction in parallel with the operating direction of the operator detected by the detecting unit and an x axis is a direction perpendicular to the operating direction.

The coordinate system determining unit may determine the coordinate system of the touch operating unit when the detecting unit detects the two or more operators which are in touch with the touch operating unit, spaced with a predetermined distance away from each other and moved by a predetermined distance on the touch operating unit.

The relative position calculating unit may calculate the relative position of each of the two or more operators from the touch position of the two or more operators detected by the detecting unit by the additional touch operation of the two or more operators after the coordinate system of the touch operating unit is determined by the coordinate system determining unit.

The information processing apparatus may include a mode selecting unit for selecting a first mode in which a y axis is a vertical direction of a housing of the information processing apparatus and an x axis is a horizontal direction of the housing or a second mode in which a y axis is a direction in parallel with an operating direction of each of the operator and an x axis is a direction perpendicular to the operating direction. The mode selecting unit selects the second mode when the detecting unit detects the two or more operators which are in touch with the touch operating unit, spaced with a predetermined distance away from each other and moved by a predetermined distance on the touch operating unit.

When the mode selecting unit selects the second mode, the coordinate system determining unit may determine the coordinate system of the touch operating unit in accordance with the operating direction of each of the two or more operators, and the relative position calculating unit calculates the relative position of the two or more operators based on the coordinate system of the touch operating unit determined by the coordinate system determining unit and the touch position of the two or more operators detected by the detecting unit after the second mode is selected by the mode selecting unit. The detecting unit may detect the touch state including a touch order and a number of touches of the two or more operators and the command issuing unit issues the predetermined operation commands in accordance with the touch order and the number of touches of the two or more operators.

According to another embodiment of the present invention, there is provided an information processing method including the steps of: detecting a touch state of each of operators which are in touch with a touch operating unit; determining a coordinate system of the touch operating unit in accordance with an operating direction of each of the detected operators; calculating a relative position of each of the two or more operators from a touch position of the two or more detected operators by the detecting unit by an additional touch operation by the two or more operators and the coordinate system of the touch operating unit determined by the coordinate system detecting unit; and issuing a predetermined operation command based on the touch state of each of the two or more operators detected at the relative position of the two or more operators calculated.

According to another embodiment of the present invention, there is provided a program for causing a computer to function as an information processing apparatus including a touch operating unit touch-operating by operators; a detecting unit for detecting a touch state of each of the two or more operators in touch with the touch operating unit; a coordinate system determining unit for determining a coordinate system of the touch operating unit in accordance with an operating direction of the operators detected by the detecting unit; a relative position calculating unit for calculating a relative position of each of the two or more operators from a touch position of the two or more operators detected by the detecting unit by an additional touch operation by the two or more operators and the coordinate system of the touch operating unit determined by the coordinate system determining unit; and a command issuing unit for issuing a predetermined operation command based on the touch state of each of the two or more operators detected by the detecting unit at the relative position of the two or more operators calculated by the relative position calculating unit.

As described above, according to the present invention, it becomes possible to perform a desired operation with use of a touch screen panel without visually recognizing the display.

BRIEF DESCRIPTION OF THE DRAWINGS

FIG. 1 is a cross sectional view illustrating holding examples of an information processing apparatus according to an embodiment of the present invention;

FIG. 9 is an explanatory view for explaining an operation history according to the embodiment;

FIG. 10 is an explanatory view for explaining touch operation examples by two operators according to the embodiment;

FIG. 11 is an explanatory view for explaining touch operation examples with two fingers according to the embodiment;

FIG. 12 is an explanatory view for explaining touch operation examples with three fingers according to the embodiment;

FIG. 13 is an explanatory view for explaining touch operation examples when two fingers are used to perform mode switching according to the embodiment;

FIG. 14 is an explanatory view for explaining touch operation examples when three fingers are used to perform mode switching according to the embodiment;

FIG. 16 is an explanatory view for explaining the touch operation where the hierarchical structure according to the embodiment is provided.

DETAILED DESCRIPTION OF THE EMBODIMENTS

Figure 2:
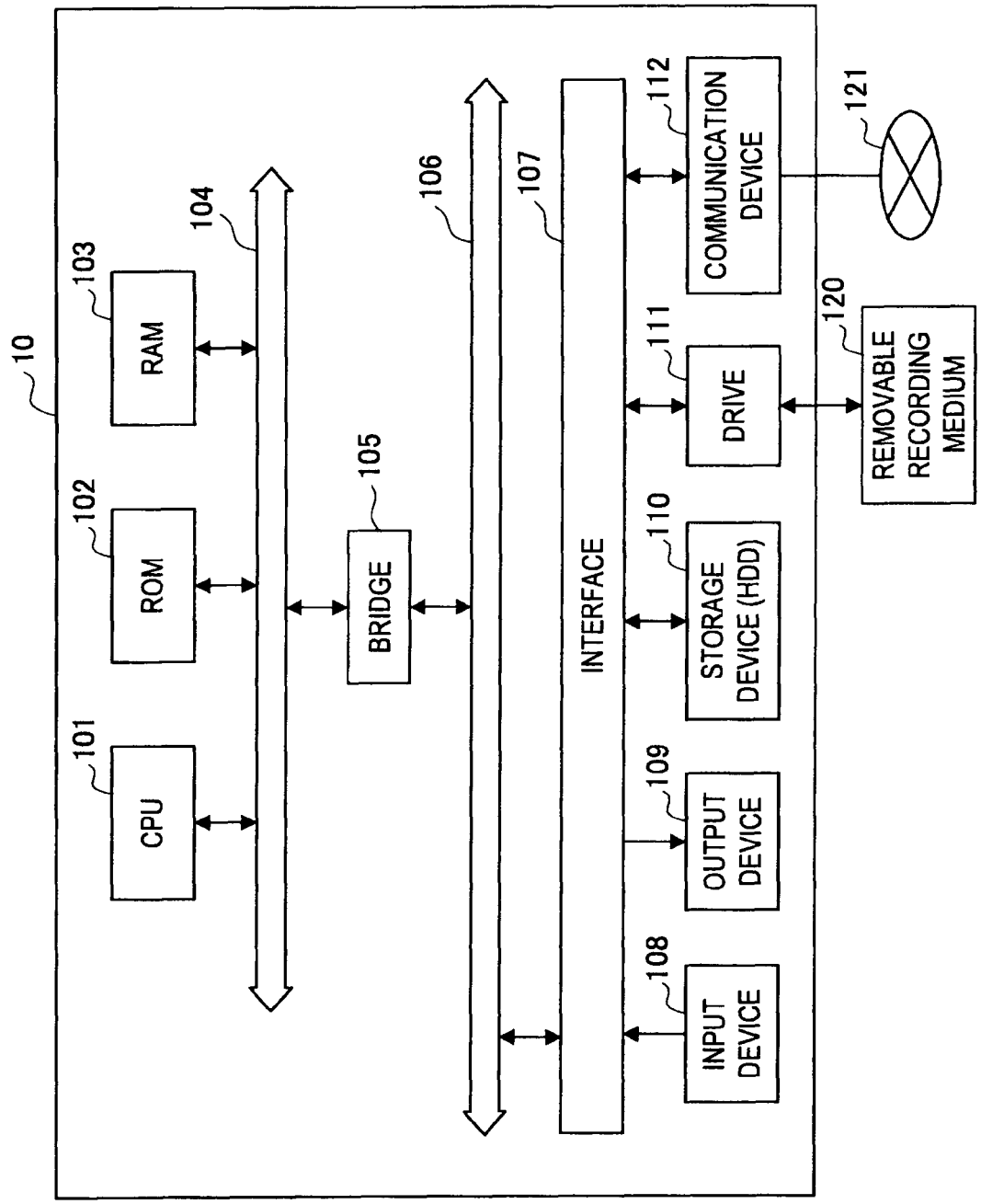
FIG. 2 is a block diagram illustrating a hardware configuration of the information processing apparatus according to the embodiment.

Hereinafter, preferred embodiments of the present invention will be described in detail with reference to the appended drawings. Note that, in the specification and the appended drawings, structural elements that have substantially the same function and structure are denoted with the same reference numerals, and repeated explanation of these structural elements is omitted.

In addition, the description of this "DETAILED DESCRIPTION OF THE INVENTION" will be made in the following order.

[1] Purpose of this embodiment
[2] Hardware configuration of Information processing apparatus
[3] Functional structure of Information processing apparatus
[4] Operation of Information processing apparatus
[5] Touch operation and command example

[1] Purpose of this Embodiment

First, description is made about the purpose of the present embodiment of the present invention. Out of the display devices, there is a touch screen (touch panel) provided with an electric capacitance type touch sensor or a resistance film type touch sensor at the surface of a display unit of a liquid crystal display or the like. With this touch screen, input to the information processing apparatus is allowed by touch on the screen of the display unit, which can facilitate user's handling of the information processing apparatus.

In recent years, the touch screen is used not only to receive input of line drawings but also to display a menu screen image or change screen images in accordance with the gesture by a finger detected by the touch screen. This structure can improve user's usability in inputting with use of the touch screen.

In the related art, a device equipped with a hardware button can be operated for a desired operation by groping the hardware button even in the bag or pocket after it is unlocked. Such an operation is performed in the following process.

(1) Hold the device in a fixed orientation
(2) Grope the unlock button and unlock
(3) Grope the hardware button of the device
(4) Perform a desired operation by push of the hardware button or the like In the above-mentioned operations (1) to (4), typically, a hardware button is assigned to each of the functions like play, fast-forward, step forward, rewind, step backward (hereinafter also referred to as "basic functions) in music device. Therefore, these are operated without visually recognizing the device even on the desk or table. Hereinafter, the operation performed without visual recognition of the device is referred to as "blind operation". In the blind operation, the device needs to be held oriented fixedly and it is difficult to grope the button by fingers.

The device using the touch screen needs to visually recognize the display and check the position of the button for operation. For this reason, the blind operation as described above is very difficult. Besides, for often used basic functions, there is need to hold the device, visually recognize the display, unlock it and visually recognize the display again. Hence, for the device using the touch screen, the user has to visually recognize the display even when he uses basic functions, which causes an issue of burden on the user's operation.

In order to solve the above-mentioned issues, for example, it has been proposed that a separate small-sized operating device is mounted on the device and the basic functions are performed by this small-sized operating device. However, when such a small-sized operating device is used, first, the device has to be attached to a cloth or the like and the small-sized operating device has to be visually recognized and operated. Besides, there is an increase in cost of manufacturing of such a small-sized operating device.

In addition, there has been proposed a desk-top size device using a touch screen or a device which is operated with one hand while the device is held with the other one hand. For such a device, playback or stop is operated by input of complicated gestures. However, the device operated by one hand needs to be held for operation, and therefore, the operating range of the fingers is small and it is difficult to input the complicated gestures.

As described above, many operating methods with use of touch screen have been proposed, however, these are predicated on the device itself or display are visually recognized during operation. Further, each operation needs to be performed while recognizing the operating direction of the device. In view of this, when the operating direction is changed relative to the device, the content operated by the user is sometimes misrecognized. Hence, it is difficult to operate the device while holding the device in any orientation.

For example, when any operation is made with use of the touch screen in the bag or the pocket, the device needs to be taken out of the bag pr pocket to visually recognize the display, which makes the operation inconvenient. Further, when the device is operated with determined gesture, the device needs to be held in the fixed orientation.

Then, in view of the above-described situations, the information processing apparatus 10 according to the embodiment of the present invention has been created. With the information processing apparatus 10 according to the present embodiment, it becomes possible to perform a desired operation with use of the touch screen panel without visually recognizing the display.

In this embodiment, the information processing apparatus 10 is described by way of example of a small-sized audio player or media player shown in FIG. 1 or a PDA (Personal Digital Assistant), a portable phone. However, the present invention is not limited to these and may be applicable to a personal computer or the like. In addition, the information processing apparatus is structured integral with a display device such as a display. However, the present invention is not limited to this and the information processing apparatus 10 may be structured separate from the display device.

In addition, as shown in the holding examples 502 and 504 of FIG. 1, the user can touch the touch screen with use of two or more fingers while holding the information processing apparatus 10 with one hand. As seen in the holding examples 502 and 504, the orientations of the fingers are different depending on the user's ways of holding the information processing apparatus 10. In other words, in the holding example 502, the orientation of the user's fingers is parallel with the vertical orientation of the housing of the information processing apparatus 10, while in the holding example 504, the orientation of the user's fingers is not vertical to nor parallel with the housing of the information processing apparatus 10.

When the information processing apparatus 10 is in the bag or pocket, the user holds the information processing apparatus 10 as shown in the holding example 502 or holding example 504. If the information processing apparatus 10 needs to be held in the fixed orientation, the user has to take the information processing apparatus 10 out of the bag or pocket and check the direction of the housing and display. However, for the information processing apparatus 10 according to this embodiment, it becomes possible to perform a desired operation with use of the touch screen panel without holding the information processing apparatus 10 in the fixed orientation.

[2] Hardware Configuration of Information Processing Apparatus

Next description is made, with reference to FIG. 2, the hardware configuration of the information processing apparatus 10 according to the present embodiment. FIG. 2 is a block diagram showing the hardware configuration of the information processing apparatus 10 according to the present embodiment.

As shown in FIG. 2, the information processing apparatus 10 has a CPU (Central Processing Unit) 101, a ROM (Read Only Memory) 102, a RAM (Random Access Memory) 103, a host bus 104, a bridge 105, an external bus 106, an interface 107, an input device 108, an output device 109, a storage device (HDD) 110, a drive 111 and a communication device 112.

The CPU 101 functions as an operating device or a control device and controls the entire operation within the information processing apparatus 10 in accordance with various programs. Besides, the CPU 101 may be a micro processor. The ROM 102 stores programs used by the CPU 101, operation parameters and the like. The RAM 103 primarily stores programs used for execution of the CPU 101 and parameters that changed appropriately in execution thereof. These are connected to each other by the host bus 104 structured of a CPU bus or the like.

The host bus 104 is connected to the external bus 106 such as a PCI bus (Peripheral Component Interconnect/Interface) via the bridge 105. Here, the host bus 104, the bridge 105 and the external bus 106 are not necessarily structured separately and may be embodied in one bus having functions of these buses.

The input device 108 is structured to have inputting means for user's inputting information, such as a mouse, a keyboard, a touch screen, a button, a microphone, switch and a lever and an input control circuit for generating an input signal based on user's input and outputting the signal to the CPU 101. The user of the information processing apparatus 10 operates the input device 108 thereby to input various data into the information processing apparatus 10 and give instructions of processing operation.

In this embodiment, the user's operation is mainly accepted by detecting an operator such as a user's finger by the touch screen. The touch screen has two functions of display and input. The touch screen according to the present embodiment is able not only to receive input of line drawings by operation of user's finger or the like but also to detect gesture by two or more user fingers. In other words, the touch screen is an input device capable of detecting two or more, plural touch points. As a way of detecting a touch point, any way can be adopted to detect the positional information of the operators in the display, such as a resistance film type using a metal thin film which forms a transparent electrode and a electric capacitance system for detecting the position by detecting change in electric capacitance between the finger end and the conducting film.

The output device 109 is structured to include, for example, a display device such as a CRT (Cathode Ray Tube) display device, an LCD (Liquid Crystal Display) device, an OLED (Organic Light Emitting Display) device and a lamp, and an audio output device such as a speaker and a headphone. The output device 109, for example, outputs a played content. Specifically, the display device displays various information such as menu screen image and played image data in the form of text or image, while the audio output device converts the played audio data and the like into sound to output the same.

The storage device 110 is a device for data storing and is structured as an example of storage of the information processing apparatus 10 according to the present embodiment. The storage device 110 may include a recording medium, a recording device for recording data in the recording medium, a reading device for reading the date from the recording medium, a deleting device for deleting the data recorded in the recording medium, and the like. The storage device 110 is structured to include, for example, a HDD (Hard Disk Drive). This storage device 110 drives the hard disk and stores programs executed by the CPU 101 and various data.

The drive 111 is a reader/writer for recording media and is provided integral with the information processing apparatus 10 or external to the information processing apparatus 10. The drive 111 reads information recorded in the removable recording medium 120 mounted thereon, such as a magnetic disk, an optical disk, a magnet-optical disk, semiconductor memory or the like and output the information to the RAM 103.

The communication device 112 is a communication interface structured to include, for example, a communication device for connecting to the communication network 121 or the like. Besides, the communication device 112 may be either of a communication device compatible with wireless LAN (Local Area Network), a wireless USB compatible communication device and a wire communication device for cable communication. This communication device 112 performs transmission and reception of various data with the external device via the communication network 121.

[3] Functional Structure of Information Processing Apparatus

Up to this point, the hardware configuration of the information processing apparatus 10 according to the present embodiment has been described with reference to FIG. 2. Next description is made, with reference to FIG. 3, about the functions of the information processing apparatus 10 according to the present embodiment.

Figure 3:
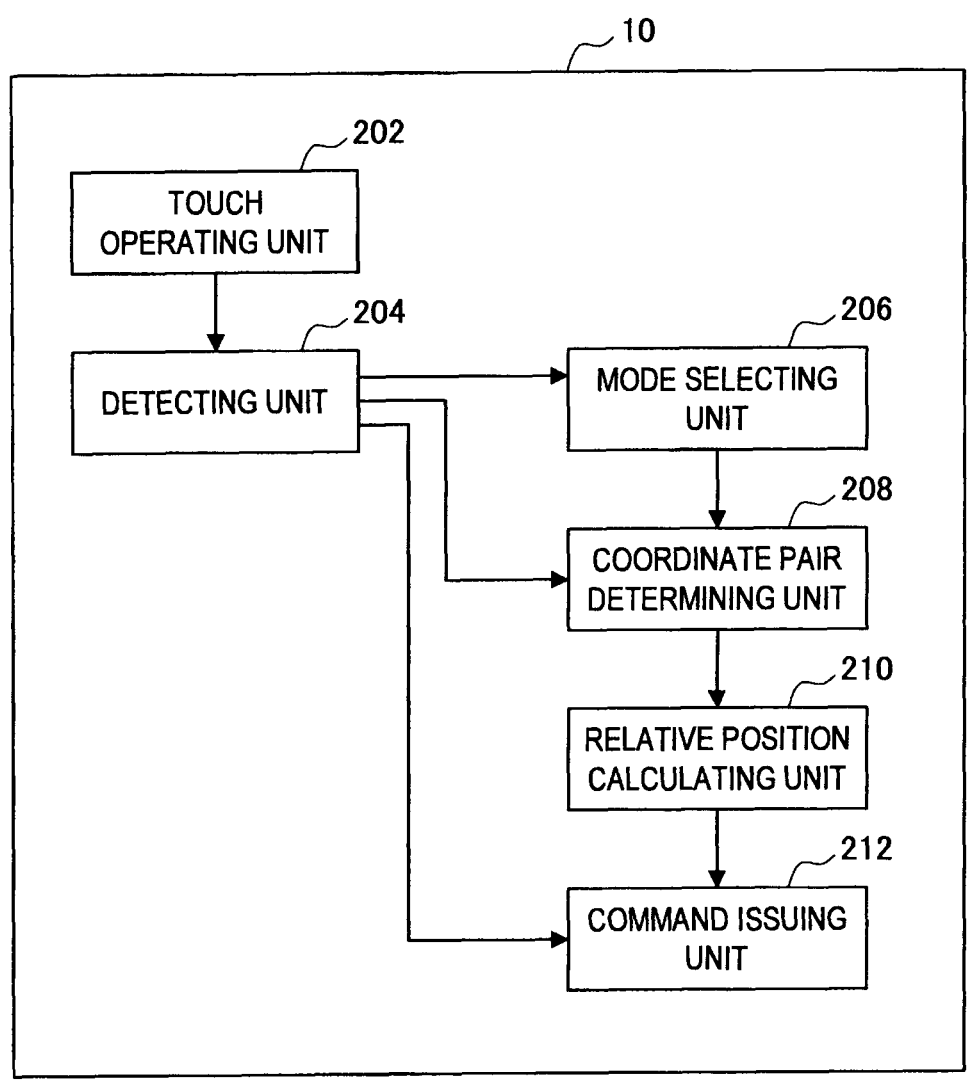
FIG. 3 is a block diagram illustrating a functional structure of the information processing apparatus according to the embodiment.

FIG. 3 is a block diagram showing the functional structure of the information processing apparatus 10 according to the present embodiment. As shown in FIG. 3, the information processing apparatus 10 according to the present embodiment has, mainly, a touch operating unit 202, a detecting unit 204, a mode selecting unit 206, a coordinate system determining unit 208, a relative position calculating unit 210, a command issuing unit 212 and the like.

The touch operating unit 202 and the detecting unit 204 are examples of the above-mentioned touch screen. The touch operating unit 202 is a display unit of the touch screen and is touch-operated by at least two operators. The at least two operators may be, for example, user's fingers, hands, stylus or the like. However, the following description is made by way of two or more user fingers as the operators.

The detecting unit 204 has a function of detecting the touch states of the two or more operators that are in touch with the touch operating unit 202. The detecting unit 204 provides the detected touch states of the two or more operators to the mode selecting unit 206 or the coordinate system determining unit 208. The touch states of the two or more operators detected by the detecting unit 204 include touch order of the two or more operators, touch positions, numbers of touches, touch times and the like. Here, with reference to FIG. 4, the touch states of the two or more operators detected by the detecting unit 204 are described.

Figure 4:
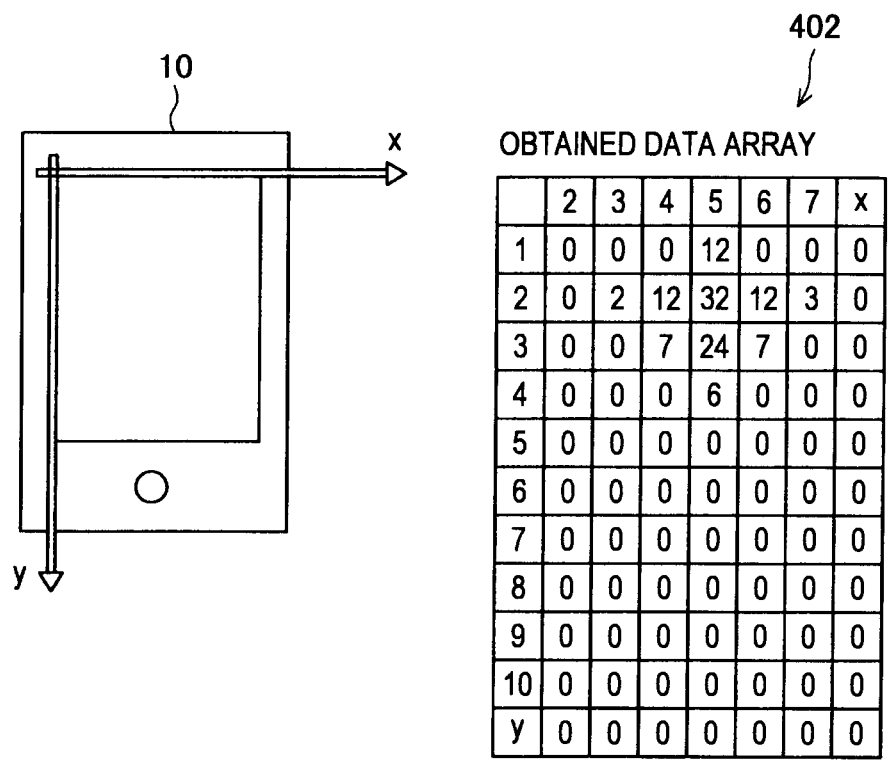
FIG. 4 is an explanatory view for explaining touch states of two or more operators detected according to the embodiment.

FIG. 4 is an explanatory view for explaining the touch states of the two or more operators detected by the detecting unit 204. As shown in FIG. 4, the detecting unit 204 obtains the number of touches (touch time), positions of the touch points of the operators where the y axis is the vertical direction of the housing of the information processing apparatus 10 and the x axis is the horizontal direction of the housing, and the like, and then obtains data array 402. The numeric values in the data array 402 indicate touch strength of the operator and a higher numeric value shows stronger touch. The touch state can be detected including the number of touches of the operators, touch center and the like by obtaining twenty data pieces per second, for example.

Returning to FIG. 3, the mode selecting unit 206 provided with detection results from the detecting unit 204 performs mode selection based on the detected touch states, from the blind mode or normal mode. The blind mode is a mode for a user operating without visually recognizing the display and the housing of the information processing apparatus 10. Specifically, it is a mode in which the y axis is a direction parallel to the operating direction of the two or more operators and the x axis is a direction vertical to the operating direction. This mode is an example of the second mode of the present invention.

Then, the normal mode is a mode for a user operating while visually recognizing the housing and display of the information processing apparatus 10. Specifically, this is a mode in which the y axis is the direction vertical to the housing of the information processing apparatus 10 and the x axis is a direction horizontal to the housing. This mode is an example of the first mode of the present invention. When the detecting result of the detecting unit 204 shows the two or more operators are in touch with the touch operating unit 202 and positioned with a predetermined space given therebetween and they move by a predetermined distance on the touch operating unit 202, the mode selecting unit 206 can determine it the blind mode. The mode selecting unit 206 notifies the coordinate system determining unit 208 of whether the mode is normal mode (first mode), the blind mode (second mode) or not.

The coordinate system determining unit 208 has a function of determining a coordinate system of the touch operating unit 202 in accordance with the operating direction of the two or more operators detected by the detecting unit 204. In addition, the coordinate system determining unit 208 may be structured to determine the coordinate system of the touch operating unit 202 when it receives a notice of the blind mode from the mode selecting unit 206. Determination of the coordinate system of the touch operating unit 202 by the coordinate system determining unit 208 is described with reference to FIG. 5.

Figure 5:
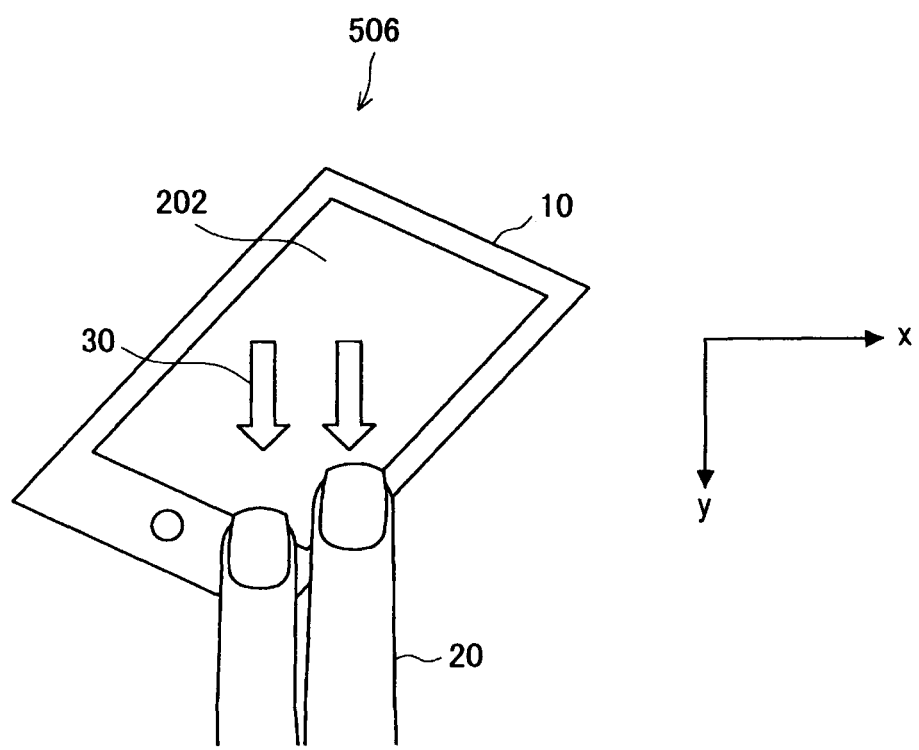
FIG. 5 is an explanatory view for explaining determination of a coordinate system of a touch operating unit by a coordinate determining unit according to the embodiment.

FIG. 5 is an explanatory view for explaining determination of a coordinate system of the touch operating unit 202 by the coordinate system determining unit 208. As shown in the touch state 506 of FIG. 5, two or more operators 20, that is, two user fingers, move in the direction shown by the touch direction 30 on the touch operating unit 202. The coordinate system determining unit 208 determines the coordinate system by setting the direction parallel to the operating direction 30 of the operators 20 to the y axis and the direction vertical to the operating direction 30 to the x axis.

Returning to FIG. 3, the relative position calculating unit 210 has a function of determining a relative position of the two or more operators from the operating positions of the two or more operators detected by the detecting unit 204 and the coordinate system of the touch operating unit 202 determined by the coordinate system determining unit 208. The relative position calculating unit 210 may be structured to calculate the relative positions of the two or more operators from the touch positions of the two or more operators detected by the detecting unit 204 after the coordinate system of the touch operating unit 202 is determined by the coordinate system determining unit 208. Further, the relative position calculating unit 210 may be structured to calculate the relative positions of the two or more operators from the touch positions of the two or more operators detected by the detecting unit 204 and coordinate system of the touch operating unit 202 determined by the coordinate system determining unit 208 after the blind mode (second mode) is selected by the mode selecting unit 206.

The command issuing unit 212 has a function of issuing a predetermined operation command based on the touch state of the two or more operators detected by the detecting unit 204 at the relative positions of the two or more operators calculated by the relative position calculating unit 210. The command issuing unit 212 specifies the command for operating the predetermined function of the information processing apparatus 10 from combination of the relative positions of the two or more operators and the touch states of the operators. The predetermined function of the information processing apparatus 10 may be music replay, stop, fast-forward, rewind, step forward, step backward and other functions in the case where the information processing apparatus 10 is a device having a music replay function. The command issued by the command issuing unit 212 will be described in detail later.

[4] Operation of Information Processing Apparatus

Figure 6:
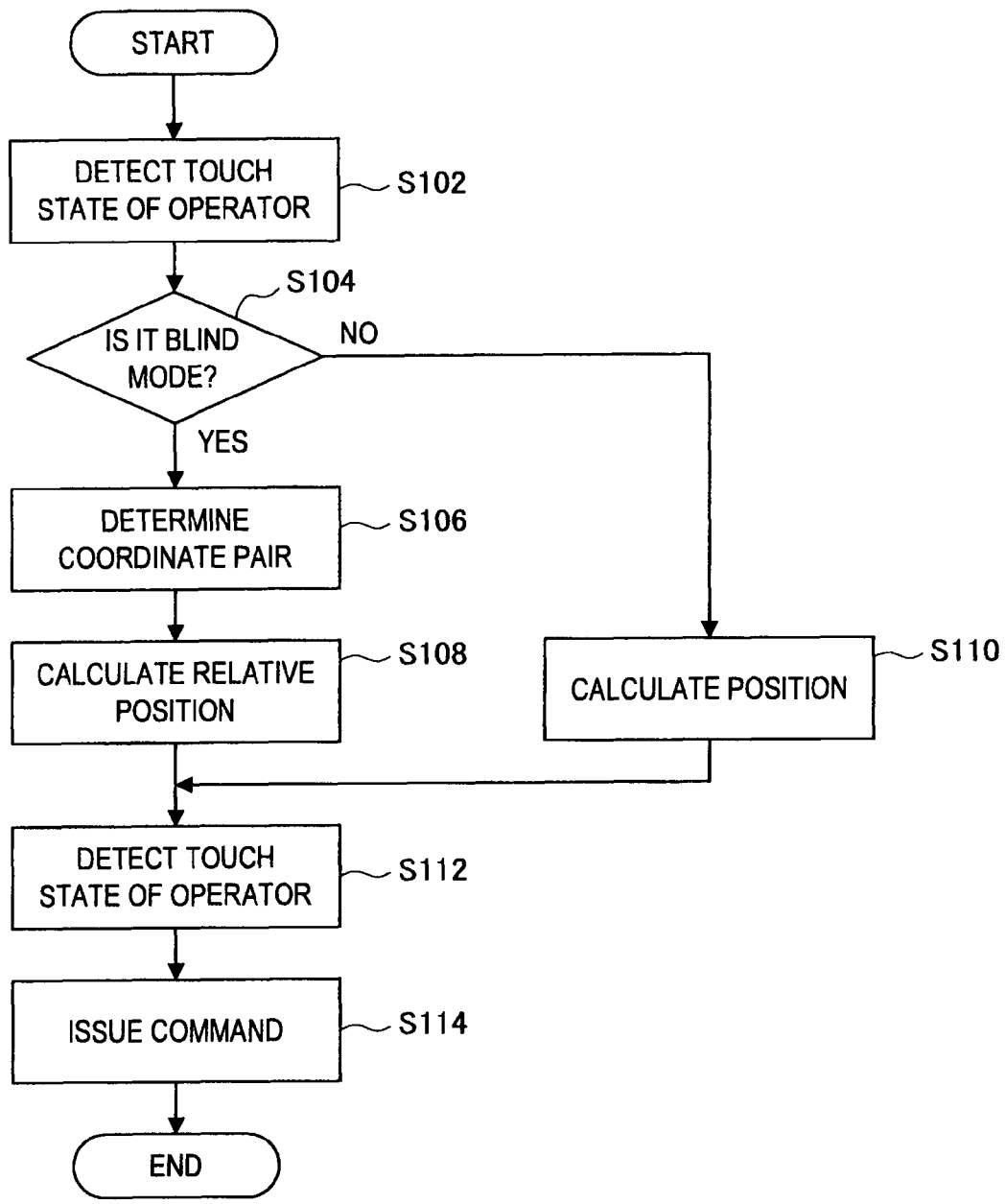
FIG. 6 is a flowchart for explaining an information processing method according to the embodiment.

Up to this point, the functional structure of the information processing apparatus 10 has been described. Next description is made, with reference to FIGS. 6 to 8, about the information processing method of the information processing apparatus 10. FIG. 6 is a flowchart for explaining the information processing method of the information processing apparatus 10.

Figure 7:
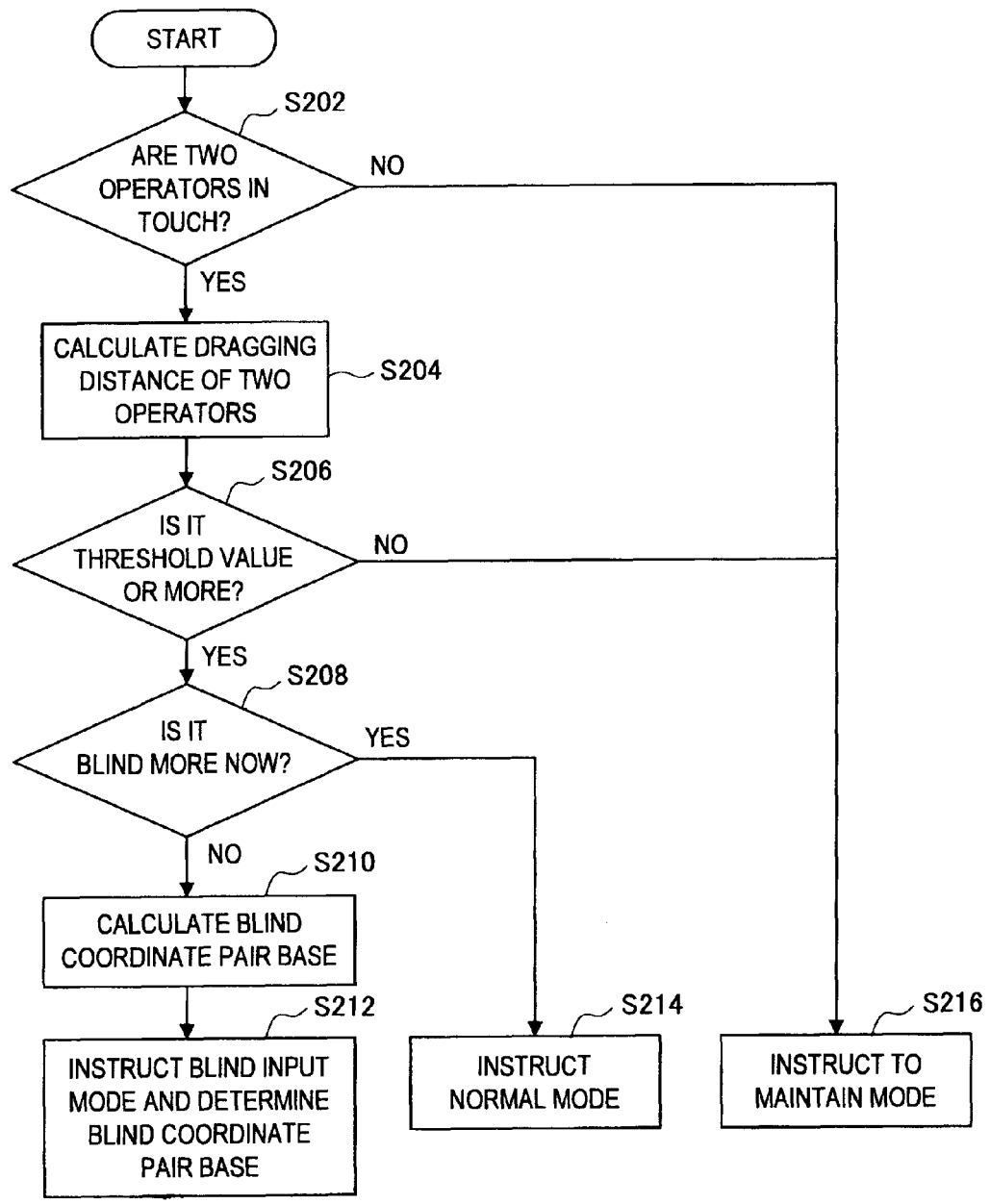
FIG. 7 is a flowchart for explaining blind mode determination processing according to the embodiment.

First, the detecting unit 204 detects the touch state of the two or more operators (S102). Then, the mode selecting unit 206 determines whether it is the normal mode or blind mode (S104). Here, description is made, with reference to FIG. 7, about the details of the determining processing whether the blind mode or not in the step S104 of FIG. 6. FIG. 7 is a flowchart for explaining the determination processing of the blind mode. In FIG. 7, the operators are two operators.

As shown in FIG. 7, first the detecting unit 204 determines whether the two touch points of the two operators are in touch with the touch operating unit 202 or not (S202). In the step S202, if it is determined that the two touch points of the two operators are not in touch with the touch operating unit 202, the current mode is maintained (S216).

In the step S202, if it is determined that the two touch points of the two operators are in touch with the touch operating unit 202, the dragging distances of the two touch points are calculated (S204). The dragging distances calculated in the step S204 are moving distance of the two operators on the touch operating unit 202. Then, it is determined whether or not the dragging distance calculated in the step S204 is equal to or more than a threshold value (S206).

The threshold value in the step S206 is, for example, 30 mm around, however, this value may be changed in accordance with the size of the housing of the information processing apparatus 10. When it is determined the dragging distance is equal to or more than the threshold value in the step S206, the mode is switched by the processing of the step 208 and the steps thereafter. That is, when the dragging distance of the two operators is equal to or more than the threshold value, the operation of the two operators means mode switching instructions. The mode switching instructions are that the normal mode is to be switched to the blind mode and the blind mode is to be switched to the normal mode.

In the step S206, when the dragging distance is equal to or more than the threshold value, it is determined whether the current mode is the blind mode or not (S208). When the dragging distance is the threshold value or less in the step S206, the current mode is maintained (S216).

In the step S208, if it is determined that the current mode is the blind mode, the normal mode instructions are given to switch to the normal mode (S214). On the other hand, in the step S208, if it is determined that the current mode is not the blind mode, the coordinate system base of the blind mode is calculated to switch to the blind mode (S210). Then, the blind input mode is instructed to determine the coordinate system base of the touch operating unit 202 (S212).

Returning to FIG. 6, in the step S104, the mode selecting unit 206 determines that the current mode is the blind mode when the detected result of the touch state in the step S102 shows the two or more operators are in touch and positioned with a predetermined space away from each other and they are moved by a predetermined distance on the touch operating unit.

When the blind mode is determined in the step S104, the coordinate system determining unit 208 determines the coordinate system of the touch operating unit 202 (S106). Then, the relative position calculating unit 210 uses the coordinate system of the touch operating unit 202 determined in the step S106 and the touch positions of the two or more operators to determine the relative positions of the two or more operators (S108). In the step S104, it is determined the mode is not the blind mode, that is, when it is determined the current mode is the normal mode, the touch positions of the two or more operators are calculated as usual assuming that the y axis is the vertical direction of the housing and the x axis is the horizontal direction (S110).

Then, the detecting unit 204 detects the touch states of the two or more operators (S112). Next, the command issuing unit 212 issues a predetermined operation command based on the touch states detected in the step S112 at the relative positions calculated in the step S108. When the normal mode is determined in the step S104, the predetermined operation command is issued based on the touch states at the position calculated in the step S110 (S114).

Figure 8:
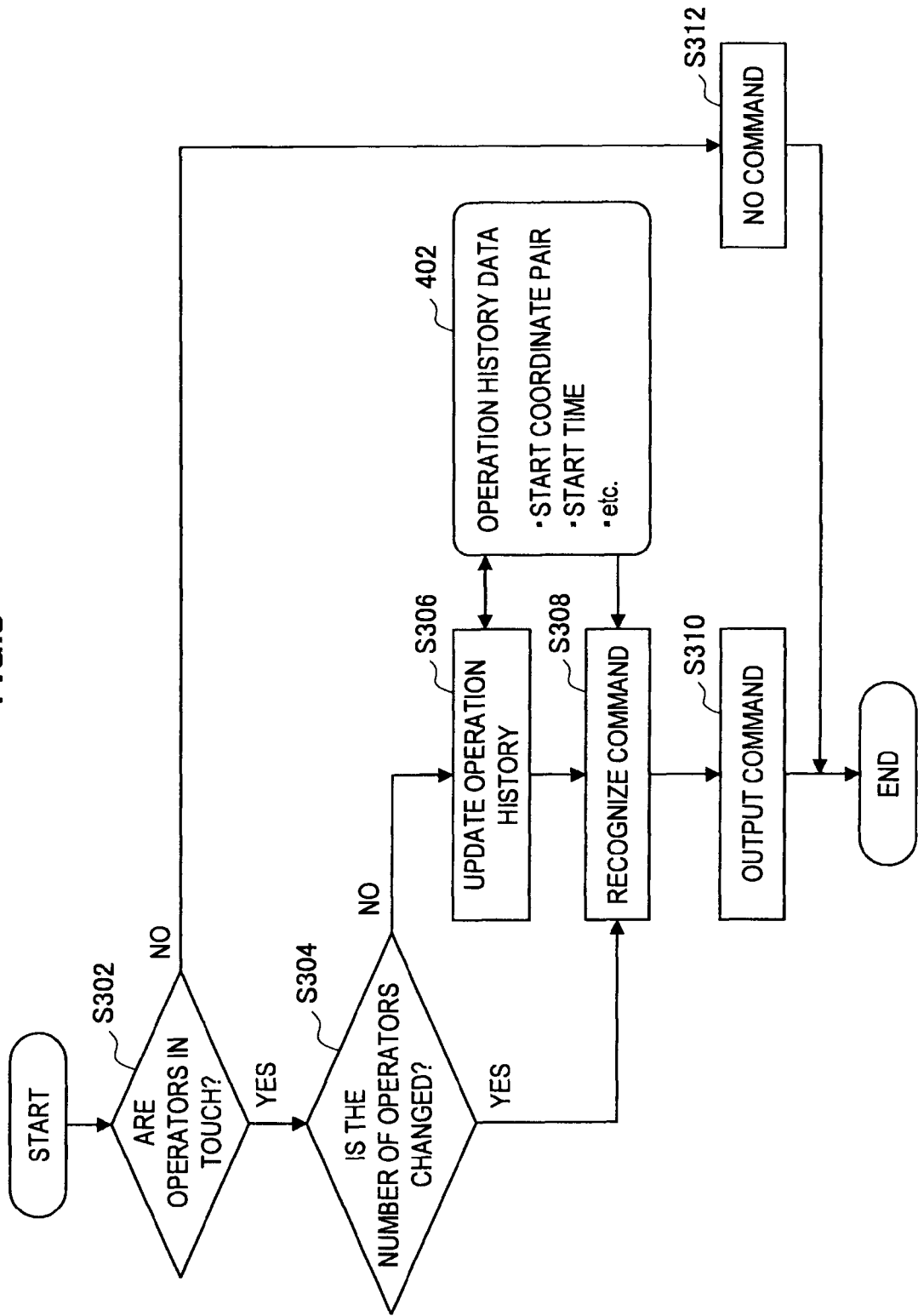
FIG. 8 is a flowchart showing the processing from detection of touch states of operators to command issuing according to the embodiment.

Here, with reference to FIG. 8, detection of the touch states of the operators in the step S112 and command issue are explained in details. FIG. 8 is a flowchart showing a flow from the processing of detecting the touch states of the operators to the processing of issuing the command. As shown in FIG. 8, first, it is determined whether the operators are in touch with the touch operating unit 202 or not (S302). In the step S302, when it is determined that the operators are in touch with the touch operating unit 202, it is determined whether or not the number of the operators is changed (S304). In the step S302, when it is determined the operators are not in touch with the touch operating unit 202, the command is not output (S312).

In the step S304, if it is determined that the number of operators is not changed, the operation history of the operation history data 402 is updated (S306).

In the step S304, if it is determined that the number of operators in touch with the touch operating unit 202 is changed, the command is recognized based on the operation history data (S308). Then, the command recognized in the step S308 is output (S310).

Here, with reference to FIG. 9, the command recognition in the step S308 is described. FIG. 9 is an explanatory view for explaining the operation history data 402. As shown in FIG. 9, in an operation history data example 410, the time in which an index finger (first operator) is in touch is set to the start 1. Then, a predetermined time later, a middle finger (second operator) is in touch, and the time in which the touch time of the middle finger is equal to or less than a predetermined time is set to the start 2. In the operation history data example 410, the command "step forward" is issued at the start 2. That is, when the number of fingers in touch is changed like 1, 2 and then 1, the command "step forward" is issued.

Then, an operation history data example 412 is explained. In the operation history data example 412, the time in which an index finger (first operator) is in touch is set to the start 1. Then, a predetermined time later, a middle finger (second operator) is in touch, and the time in which the touch time of the middle finger is equal to or less than a predetermined time is set to the start 2. In the operation history example 412, if the middle finger remains in touch for a predetermined time after passing through the start 2, the command "fast-forward" is issued during the time period when the middle finger is in touch.

[5] Examples of Contact Operation and Command

Up to this point, the information processing method of the information processing apparatus 10 has been described. Next description is made, with reference to FIGS. 10 to 16, about the command examples issued by the command issuing unit 212. FIG. 10 is an explanatory view for explaining examples of touch operation by two operators. In FIG. 10, the two operators are described as an index finger and a middle finger. The touch operation example 21 shows a state where the index finger is used to flick and drag the touch surface and the middle finger is not in touch. Here, flick/drag means an action of dragging and flicking the touch surface by a finger.

The touch operation example 22 shows the index finger and the middle finger are used to tap the touch surface simultaneously. Here, tapping is an action of tapping or patting the touch surface with a finger. The touch operation example 23 shows the touch surface is tapped sequentially with the index finger and the middle finger, in this order. The touch operation example 24 shows the touch surface is double-tapped simultaneously by the index finger and the middle finger.

Next description is made, with reference to FIG. 11, about examples of touch operation with two fingers. FIG. 11 is an explanatory view for explaining examples of touch operation by two fingers. As shown in FIG. 11, the touch operation example 25 shows the two fingers are used to flick and drag the touch surface. For example, the index finger and the middle finger are mode horizontally alternately, or only the index finger is used to flick and drag the screen while the middle finger is in touch. The middle finger and the index finger may be simultaneously used to flick and drag the screen.

The touch operating example 26 shows tapping is only performed with the two fingers. For example, the index finger and the middle finger are used to tap the screen simultaneously or alternately. Besides, the touch operation example 27 shows the touch surface is tapped and flicked/dragged with either of the index finger and the middle finger. For example, the index finger or the middle finger is only used to flick/drag the screen or the index finger or the middle finger is only used to tap the screen.

Next description is made, with reference to FIG. 12, about examples of touch operation with three fingers. FIG. 12 is an explanatory view for explaining examples of touch operation by three fingers. As shown in FIG. 12, the touch operation example 28 shows the touch surface is flicked/dragged with any two of the three fingers of the index finger, the middle finger and the ring finger. For example, flicking/dragging with the middle finger and tapping with the ring finger may be performed simultaneously, or the middle finger and the ring finger are used simultaneously for flicking and dragging.

The contact operation example 29 shows tapping of the touch surface with any two of three fingers. For example, the index finger and the ring finger are used to tap the screen simultaneously or the middle finger and the ring finger are used to tap the screen one by one. The touch operation example 30 shows the touch surface is flicked/dragged or tapped with any one of three fingers. For example, only the index finger is used to tap the screen or ring finger is only used to flick/drag the screen.

The touch operation example 31 shows flicking/dragging is performed with any of three fingers. For example, only the index finger is used to flick/drag the surface while the middle and ring fingers are in touch with the touch surface. Or, the middle and ring fingers are used to flick/drag the surface while the index finger is in touch with the touch surface. The touch operation example 32 and the touch operation example 33 show a state where the touch surface is tapped by three fingers. For example, the index finger and the middle finger are used simultaneously to tap the surface and then, the ring is used to tap the surface. Or, the three fingers are used to tap the surface one by one.

Next description is made, with reference to FIG. 13, about examples of mode switching or the like with two fingers. As shown in FIG. 13, the touch operation example 41 shows the mode is switched by flicking/dragging with two fingers simultaneously. For example, when the two fingers are used to flick/drag the surface from top down, the blind mode is turned on. When the two fingers are used to flick/drag the surface from bottom up, the blind mode can be turned off.

The touch operation example 42 shows replay and stop of music contents by double-tapping of the touch surface with either of two fingers or simultaneous tapping with the two fingers. For example, for music replay, the touch surface is double-tapped only with the index finger, and for stop reply of the music content, the surface is tapped with the index finger and the middle finger simultaneously.

The touch operation example 43 and the touch operation example 44 show "fast-forward", "step forward", "rewind", "step backward" of music contents are performed by tapping the touch surface with two fingers one after another. For example, for "fast-forward" or "step forward", the surface is tapped with the index finger and the middle finger in this order. For "rewind" and "step backward", the surface is tapped with the middle finger and the index finger, in this order. The touch operation example 45 shows turning up or down of the volume by flicking/dragging of the touch surface with any of two fingers. For example, for turning up of the volume, the index finger is used to flick/drag the surface from bottom up. For turning down of the volume, the index finger is used to flick/drag the surface from top down.

Next description is made, with reference to FIG. 14, about a touch operation example in which three fingers are used in mode switching of the like. As shown in FIG. 14, the touch operation example 46 shows a state where the three fingers are simultaneously used to flick and drag the screen for mode switching. For example, when the three fingers are used to flick and drag the screen from top down, the blind mode may be turned on. When the three fingers are used to flick and drag the screen from bottom up, the blind mode may be turned off.

The touch operation example 47 shows replay and stop of music contents by double tapping of the touch surface with three fingers simultaneously or one after another. For example, in order to replay music, the index finger and the ring finger are used to tap the surface simultaneously and then, the middle finger is used to tap the surface. In order to stop relay of the music content, the middle finger is used to tap the surface and then, the index finger and the ring finger are used to tap the surface simultaneously.

The touch operation example 48 and the touch operation example 49 show a state where "fast-forward", "step forward", "rewind", "step backward" of music contents are performed by tapping the touch surface with three fingers simultaneously or one after another. For example, for "fast-forward" or "step forward", the index finger and the middle finger are used to tap the surface simultaneously and then, the ring finger is used to tap the surface. For "rewind" and "step backward", the middle finger and the ring finger are used to tap the surface simultaneously and then, the index finger is used to tap the surface. The touch operation example 50 shows turning up or down of the volume by flicking/dragging of the touch surface with any of three fingers. For example, for turning up of the volume, the middle finger is used to flick/drag the surface from bottom up while the index finger and ring finger are in touch with the surface. For turning down of the volume, the middle finger is used to flick/drag the surface from top down while the index finger and ring finger are in touch with the surface.

Next description is made, with reference to FIGS. 15 and 16, about a touch operation in which the information processing apparatus 10 has a hierarchical structure similar to that of the user interface of a typical application for replaying music contents (hereinafter referred to as "music content replay application"). In the following description, it is assumed that three fingers are used to change a selection range of the hierarchy and move up and down in the hierarchy.

Figure 15:
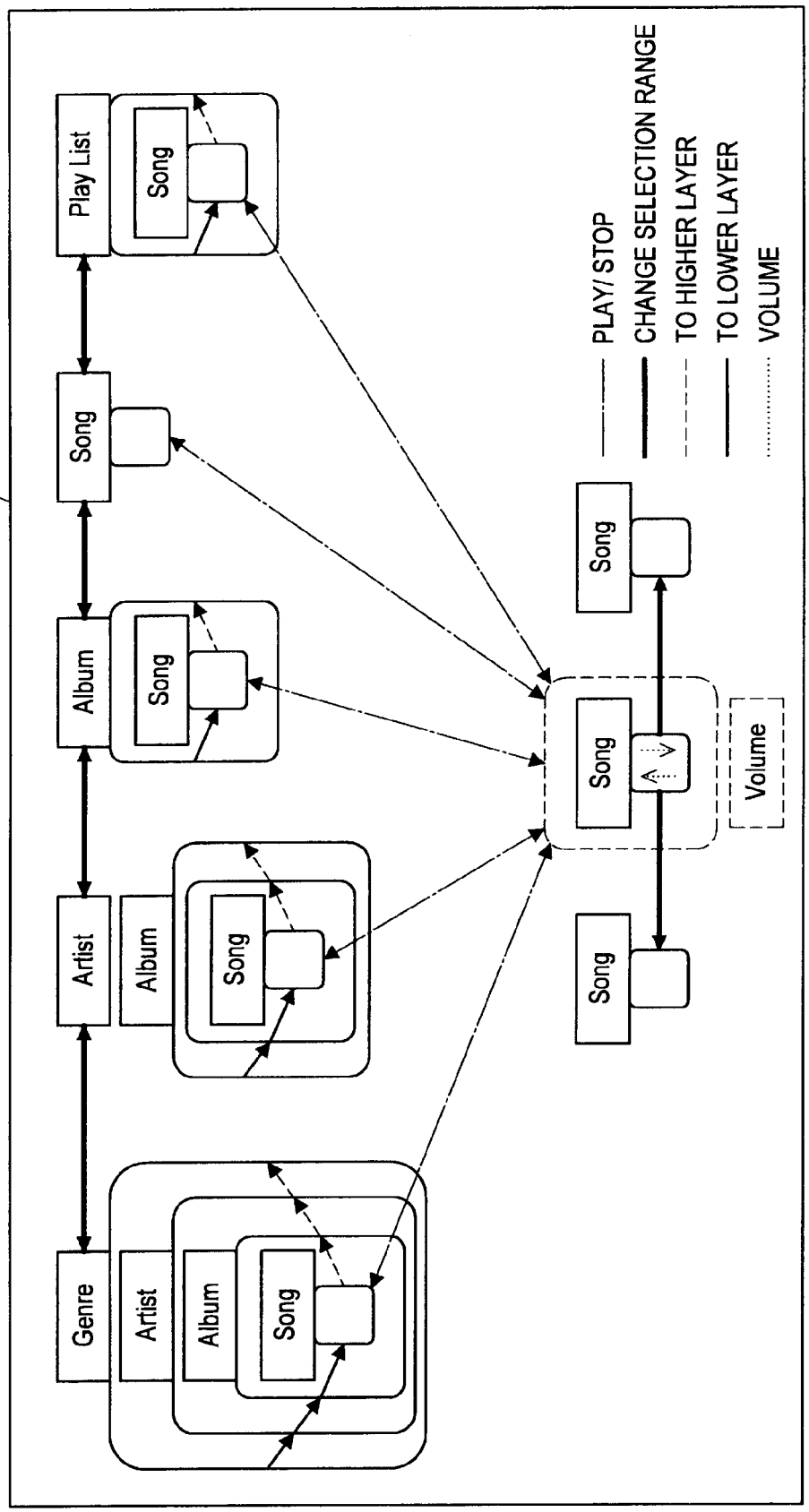
FIG. 15 is an explanatory view for explaining hierarchy structure of the information processing apparatus 10 according to the embodiment.

FIG. 15 is an explanatory view for explaining the contents stored in the hierarchical structure. As shown in FIG. 15, the structure has layers of, from above, Genre, Artist, Album, Song and Playlist in this order. The user performs touch operation with two or three fingers thereby to be able to change the selection range or move to the higher layer or lower layer.

With reference to FIG. 16, explanation is made about explaining of touch operation examples of changing a selection target or moving to another layer. In FIG. 16, touch operation examples 52 to 54 are explanatory views for explaining the touch operation with user of two fingers. The touch operation example 52 shows changing of selection target by touch with two fingers one after another. For example, first the index finger is used to touch, which is followed by continuous touch with the middle finger thereby to step forward one selection target, or first the index finger is used to touch, which is followed by tapping with the middle finger thereby to step forward selection targets sequentially.

The touch operation example 53 shows moving to a higher layer by tapping with two fingers simultaneously. For example, the index finger and the middle finger are both used simultaneously to tap the screen thereby to move to the higher layer. The touch operation example 54 shows moving to a lower layer by double-tapping with either of two fingers. For example, the index finger is only used to double-tap the screen so as to move to the lower layer.

Touch operation examples 55 to 57 in FIG. 16 are explanatory views for explaining the touch operation with user of three fingers. The touch operation example 55 shows changing of the selection target by touching with three fingers simultaneously or one after another. For example, the index finger and the middle finger are used simultaneously to touch the screen, which is followed by continuous touching with the ring finger thereby to step forward one selection target, or the middle finger and the ring finger are used to touch the screen, which is followed by tapping with the index finger thereby to step forward selection targets continuously.

The touch operation example 56 shows moving to a higher layer by double tapping or tapping with the three fingers. For example, the three fingers are used simultaneously to touch the screen and then, the index finger is used to double-tap the screen, which is followed by tapping with the middle finger and ring finger thereby to move to the upper layer. The touch operation example 57 shows moving to a lower layer by double tapping or tapping with the three fingers. For example, the three fingers are used simultaneously to touch the screen and then, the index finger and the middle finger are used to tap the screen, which is followed by double-tapping with the ring finger thereby to move to the lower layer. Examples of the touch operation and command have been described hereinabove.

With the information processing apparatus 10 according to this embodiment, the operation states of two or more operators in touch with the touch operating unit 202 are detected to determine the coordinate system of the touch operating unit 202 in accordance with the operating directions of the two or more operators. Then, the coordinate system determined and the touch positions of the two or more operators are used to calculate the relative positions of the two or more operators, and the touch states of the two or more operators at the relative positions are used as a basis so as to issue various operating commands.

With this structure, regardless of how the housing of the information processing apparatus 10 is oriented, the operating directions of the operators are judged so that the user can perform desired operations without paying attention to the orientation of the housing. Hence, the user can perform desired operations with the touch screen panel without visually recognizing the housing or display of the information processing apparatus 10. For example, when the information processing apparatus 10 is placed in the bag or pocket, the user can perform desired operations without taking it out of the pocket or bag.

It should be understood by those skilled in the art that various modifications, combinations, sub-combinations and alterations may occur depending on design requirements and other factors insofar as they are within the scope of the appended claims or the equivalents thereof.

For example, the present embodiment has been described by way of the example where the user can perform desired operations without visually recognizing the housing and display of the information processing apparatus 10. However, the present invention is not limited to this example. For example, when an application other than the application for replaying music contents (hereinafter referred to as "music content replay application") is running, the operations of replaying and stopping music contents replay and the like may be performed without switching the displayed application. In other words, when an application other than the music content replay application is running, the above-described specific operation by operators is performed to switch to the blind mode and detect the operation of the operators. As the operators' operation is detected after switching to the blind mode, the application other than the music content replay application can continue to run in order to replay, stop the music contents and the like.

The present application contains subject matter related to that disclosed in Japanese Priority Patent Application JP 2008-280021 filed in the Japan Patent Office on Oct. 30, 2008, the entire content of which is hereby incorporated by reference.

What is claimed is:

1. An information processing apparatus comprising:
    a touch operating unit, wherein the touch operating unit is configured to be touch operated by two or more operators;
    a detecting unit, wherein the detection unit is configured to detect whether the two or more operators are in touch with the touch operating unit;
    a mode selecting unit, wherein the mode selecting unit is configured to select between a blind mode or a normal mode based on the touch state detected by the detecting unit, wherein:
        the normal mode is configured to both receive user input from the two or more operators and provide visual feedback through a display screen of the touch operating unit; and
        the blind mode is configured to receive user input from the two or more operators without any visual feedback from the display screen of the touch operating unit;
    a coordinate system determining unit, wherein the coordinate system determining unit is configured to determine in the blind mode an independent coordinate system different from a default coordinate system of the touch operating unit, wherein the independent coordinate system in the blind mode is according to a dragging direction of the two or more operators on the touch operating unit;
    a relative position calculating unit, wherein the relative position calculating unit is configured to calculate a relative position of each of the two or more operators on the independent coordinate system in the blind mode; and
    a command issuing unit, wherein the command issuing unit is configured to issue a predetermined operation command based on the relative position of the touch state and movement of each of the two or more operators on the independent coordinate system,
    wherein the touch operating unit, the detecting unit, the mode selecting unit, the coordinate system determining unit, the relative position calculating unit, and the command issuing unit are each implemented via at least one processor.

2. The information processing apparatus according to claim 1, wherein the coordinate system determining unit determines the independent coordinate system of the touch operating unit on a condition where a y axis is a direction in parallel with the operating direction of the operator detected by the detecting unit and an x axis is a direction perpendicular to the operating direction.

3. The information processing apparatus according to claim 1, wherein the coordinate system determining unit determines the independent coordinate system of the touch operating unit when the detecting unit detects the two or more operators which are in touch with the touch operating unit, spaced with a predetermined distance away from each other and moved by a predetermined distance on the touch operating unit.

4. The information processing apparatus according to claim 1, wherein the relative position calculating unit calculates the relative position of each of the two or more operators from the touch position of the two or more operators detected by the detecting unit by the additional touch operation of the two or more operators after the independent coordinate system of the touch operating unit is determined by the coordinate system determining unit.

5. The information processing apparatus according to claim 1, comprising an orientation selecting unit, wherein:
    the orientation selecting unit is configured to select a first mode in which a y axis is a vertical direction of a housing of the information processing apparatus and an x axis is a horizontal direction of the housing or a second mode in which a y axis is a direction in parallel with an dragging direction of the two or more operators and an x axis is a direction perpendicular to the dragging direction of the two or more operators; and
    the orientation selecting unit is configured to select the second mode when the detecting unit detects the two or more operators which are in touch with the touch operating unit, spaced with a predetermined distance away from each other and dragged by a predetermined distance on the touch operating unit.

6. The information processing apparatus according to claim 5, wherein:
    when the orientation selecting unit is configured to select the second mode, the coordinate system determining unit determines the independent coordinate system of the touch operating unit in accordance with the dragging direction of each of the two or more operators; and
    the relative position calculating unit is configured to calculate the relative position of the two or more operators based on the independent coordinate system of the touch operating unit determined by the coordinate system determining unit and the touch position of the two or more operators detected by the detecting unit after the second mode is selected by the orientation selecting unit.

7. The information processing apparatus according to claim 1, wherein the detecting unit detects the touch state including a touch order and a number of touches of the two or more operators and the command issuing unit issues the predetermined operation commands in accordance with the touch order and the number of touches of the two or more operators.

8. An information processing method, the method being executed via at least one processor, and comprising:
  detecting a touch state of each of two or more operators which are in touch with a touch operating unit;
  performing a mode selection between a blind mode or a normal mode based on the touch state, wherein:
    the normal mode is configured to both receive user input from the two or more operators and provide visual feedback through a display screen of the touch operating unit, and
    the blind mode is configured to receive user input from the two or more operators without any visual feedback from the display screen of the touch operating unit;
  determining an independent coordinate system in the blind mode is different from a default coordinate system of the touch operating unit, wherein the independent coordinate system is according to a dragging direction of the detected two or more operators on the touch operating unit;
  calculating a relative position of each of the two or more operators on the independent coordinate system in the blind mode; and
  issuing a predetermined operation command based on the relative position of the touch state and movement of each of the two or more operators on the independent coordinate system.

9. A non-transitory computer-readable storage medium having stored thereon a program, which when executed by a computer causes the computer to execute a method, the method comprising:
  detecting a touch state of each or two or more operators which are in touch with a touch operating unit;
  selecting between a blind mode or a normal mode based on the touch state detected by the detecting unit, wherein:
    the normal mode is configured to both receive user input from the two or more operators and provide visual feedback through a display screen of the touch operating unit; and
    the blind mode is configured to receive user input from the two or more operators without any visual feedback from the display screen of the touch operating unit;
  determining, in the blind mode, an independent coordinate system different from a default coordinate system of the touch operating unit, wherein the independent coordinate system in the blind mode is according to a dragging of the two or more operators on the touch operating unit;
  calculating a relative position of each of the two or more operators on the independent coordinate system in the blind mode; and
  issuing a predetermined operation command based on the relative position of the touch state and movement of each of the two or more operators on the independent coordinate system.

10. The information processing method according to claim 8, wherein said determining the independent coordinate system determines the coordinate system of the touch operating unit on a condition where a y axis is a direction in parallel with the operating direction of the operator detected by the detecting unit and an x axis is a direction perpendicular to the operating direction.

11. The information processing method according to claim 8, wherein said determining the independent coordinate system determines the independent coordinate system of the touch operating unit when the detecting unit detects the two or more operators which are in touch with the touch operating unit, spaced with a predetermined distance away from each other and moved by a predetermined distance on the touch operating unit.

12. The information processing method according to claim 8, wherein said calculating the relative position calculates the relative position of each of the two or more operators from the touch position of the two or more operators detected by the detecting unit by the additional touch operation of the two or more operators after the independent coordinate system of the touch operating unit is determined.

13. The information processing method according to claim 8, further comprising:
  selecting a first mode in which a y axis is a vertical direction and an x axis is a horizontal direction of the housing; and
  selecting a second mode in which a y axis is a direction in parallel with an operating direction of each of the operator and an x axis is a direction perpendicular to the dragging direction,
  wherein the second mode is selected when the detecting unit detects the two or more operators which are in touch with the touch operating unit, spaced with a predetermined distance away from each other and dragged a predetermined distance on the touch operating unit.

14. The information processing method according to claim 13, wherein when the second mode is selected, the independent coordinate system of the touch operating unit is selected in accordance with the dragging direction of each of the two or more operators, and
  the relative position is calculated based on the relative position of the two or more operators based on the determined independent coordinate system of the touch operating unit and the touch position of the two or more operators after the second mode is selected.

15. The information processing method according to claim 8, wherein the touch state is detected including a touch order and a number of touches of the two or more operators and predetermined operation commands are issued in accordance with the touch order and the number of touches of the two or more operators.

16. The information processing apparatus of claim 1, wherein the relative position calculating unit is configured to calculate the relative position of each of the two or more operators on the independent coordinate system based on a touch position of the two or more operators detected by the detecting unit through an additional touch operation by the two or more operators on the independent coordinate system.

17. The information processing method of claim 8, wherein said calculating the relative position of each of the two or more operators on the independent coordinate system in the blind mode is based on a touch position of the two or more detected operators by an additional touch operation by the two or more operators on the independent coordinate system.

* * * * *